United States Patent [19]
Deregibus

[11] Patent Number: 5,820,727
[45] Date of Patent: Oct. 13, 1998

[54] MACHINE PARTICULARLY FOR PRODUCING VULCANIZED RUBBER TUBES

[75] Inventor: Andrea Deregibus, Padova, Italy

[73] Assignee: Tubigomma Deregibus S.r.l., Saccolongo, Italy

[21] Appl. No.: 629,652

[22] Filed: Apr. 9, 1996

[30] Foreign Application Priority Data

Apr. 12, 1995 [IT] Italy ................................. PD95A0070

[51] Int. Cl.$^6$ ................................................. B65H 18/00
[52] U.S. Cl. ......................... 156/443; 156/392; 156/429; 156/446; 242/471
[58] Field of Search ..................................... 156/392, 184, 156/187, 188, 195, 143, 443, 171, 173, 431, 432, 446, 459, 425, 428; 242/471

[56] References Cited

U.S. PATENT DOCUMENTS

| | | |
|---|---|---|
| 3,730,795 | 5/1973 | Medney et al. .......................... 156/169 |
| 4,413,792 | 11/1983 | O'Connor ................................ 242/471 |
| 4,719,676 | 1/1988 | Sansone . | |
| 5,205,889 | 4/1993 | Cioffi et al. .......................... 156/188 X |

FOREIGN PATENT DOCUMENTS

| | | |
|---|---|---|
| 0356759 | 3/1990 | European Pat. Off. . |
| 0410367 | 1/1991 | European Pat. Off. . |
| 0626249 | 11/1994 | European Pat. Off. . |

*Primary Examiner*—James Engel
*Attorney, Agent, or Firm*—Guido Modiano; Albert Josif

[57] ABSTRACT

The machine for producing vulcanized rubber tubes comprises two mutually opposite head sections, each having a base that supports two spindles. At least a first one of the two head sections has motorized spindles. A corresponding tubular core is rotated constantly, during operation, between the mutually opposite spindles of the two head sections and is supported, along its span, by supporting elements that are fixed to a supporting frame interposed between the two head sections. The two motorized spindles connected to the first head section are each supported together with a respective drive unit on a first slider that is movably coupled to the corresponding base. The slider is inclined with respect to a horizontal plane such that its upper part is exposed frontally to the operator.

14 Claims, 2 Drawing Sheets

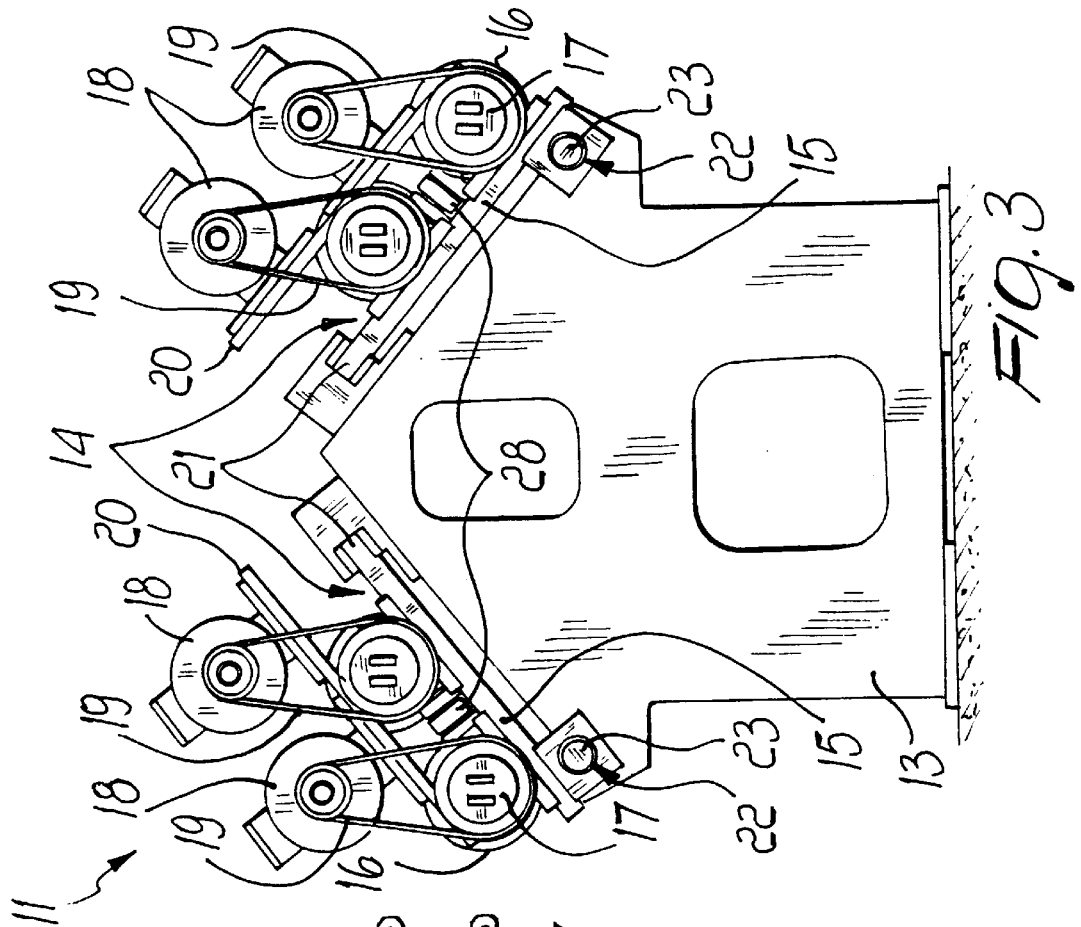
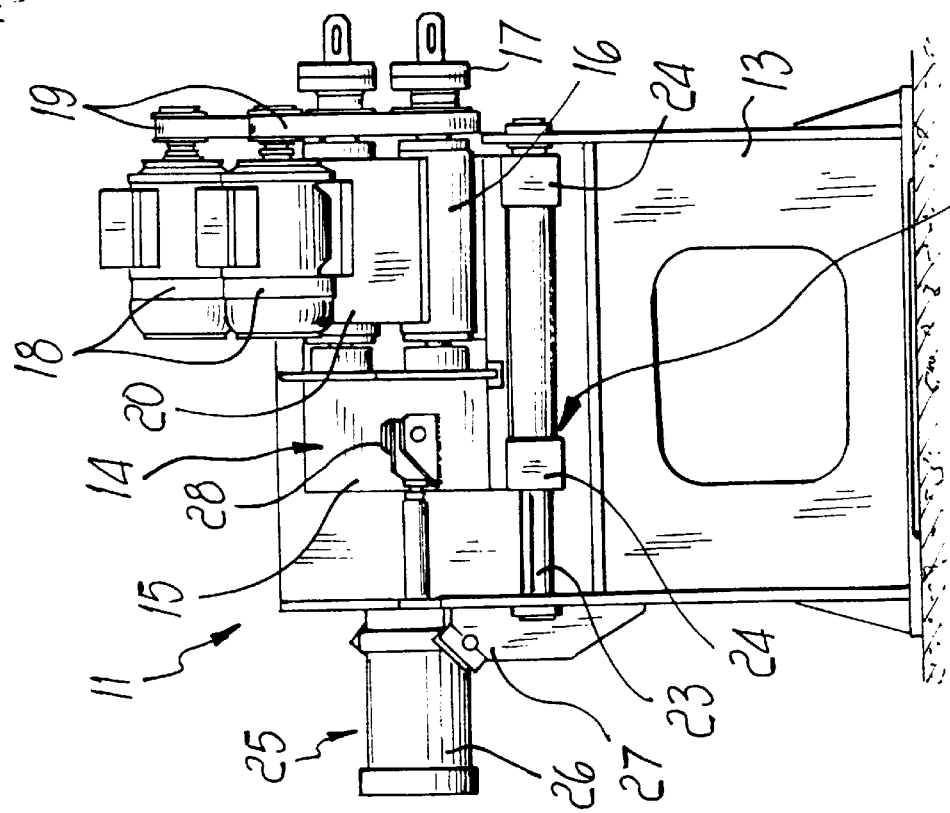

MACHINE PARTICULARLY FOR PRODUCING VULCANIZED RUBBER TUBES

BACKGROUND OF THE INVENTION

The present invention relates to a machine particularly for producing vulcanized rubber tubes.

The machines currently used for producing vulcanized rubber tubes have fixed-position spindles, each of which turns a metal core supported by intermediate supports constituted by rollers that are rigidly coupled to a platform.

The operator is carried by a carriage which moves at a constant speed and wraps around the core, in a helical pattern, successive layers of tapes of fabric and crude rubber.

The last wrapping is provided by a lapping with tight bandaging.

Once the last wrapping has been performed, the core whereon the now-formed rubber tube is wrapped is removed from the supporting platform and inserted in an autoclave, where the rubber is subjected to a steam vulcanization process.

Once the tube has been vulcanized, it is removed from the autoclave, the last lapping is unwound off it, and the tube is transferred to a station where the core is extracted; the tube is then wound in coils.

This production method has the main drawback of requiring the provision of equipment and facilities that are very bulky and expensive, with a considerable use of specialized personnel.

In order to obviate the above mentioned drawbacks, machines have been provided which provide vulcanization by Joule effect.

In these machines, the cores wrapped by the tube to be vulcanized are supplied with electric current.

Said cores, which normally have a high electrical resistance, heat up and cause vulcanization of the rubber.

Thermally insulated openable platforms have been provided for this purpose; they are arranged to the side of the core line and are adapted to contain said cores during vulcanization.

However, these machines still have drawbacks, especially as regards production yields as well as the possibility of automation and the reduction of plant costs.

A further evolution of these known machines is currently commercially available, and comprises two heads with spindles that are mutually opposite and turn at least one tubular core that is supported by first supporting elements having fixed rollers on a supporting core.

The line of rollers, and therefore the tubular core, is flanked by a box-like openable and thermally insulated container adapted to contain said core, which is wrapped by the tube to be vulcanized and is unloaded by transfer means rigidly coupled to the frame.

The heads of the box-like container have electrical terminals for supplying power to the core and heating it by Joule effect.

Furthermore, transfer means transfer the core from said container onto second retracting supporting elements provided with rollers, which are articulated to the frame, to extract the core from the vulcanized tube by air injection.

Although this machine provides considerable improvements with respect to prior ones, it is not free from some drawbacks, the main one being a certain difficulty in maintenance and/or repair of the spindles, which are difficult to access owing to their position.

SUMMARY OF THE INVENTION

A principal aim of the present invention is to provide a machine for manufacturing vulcanized rubber tubes which, in addition to high productivity levels, production quality, and automation, optionally allows easy access to the spindles during maintenance and/or repair.

Accordingly, an object of the present invention is to provide a machine which can be manufactured with known technologies and which is versatile in use, particularly in relation to the length of the tubes to be produced.

Another object of the present invention is to provide a machine for producing vulcanized rubber tubes that allows a considerable reduction in the specialized personnel required for its operation and for its maintenance and/or repair.

Another object of the present invention is to provide a machine for producing vulcanized rubber tubes whose overall cost, in relation to its constructive simplicity, is competitive with respect to known machines.

A further object of the present invention is to provide a machine for producing vulcanized rubber tubes which has an ergonomic structure for facilitating the work of the operators.

Another object of the present invention is to provide a machine for producing vulcanized rubber tubes that can be easily associated with a Joule-effect vulcanization oven.

This aim, these objects, and others which will become apparent hereinafter are achieved by a machine for producing vulcanized rubber tubes, which comprises two mutually opposite head sections, each having a base supporting at least one pair of spindles, at least a first one of said two head sections having motorized spindles, the mutually opposite spindles of said two head sections rotating, during operation, a corresponding tubular core supported, along its span, by supporting elements fixed to a supporting frame interposed between said two head sections, characterized in that each one of said pairs of motorized spindles is supported, together with its drive unit, on a corresponding first slider which is movably coupled to the corresponding base, said first slider being inclined with respect to a horizontal plane such that its upper part is exposed frontally to the operator.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein:

FIG. 2 is a front elevational detail view of a first head section of the machine of FIG. 1;

FIG. 3 is an end elevational view of the first head section of the machine of FIGS. 1 and 2;

DESCRIPTION OF THE PREFERRED EMBODIMENTS

Figure 4:
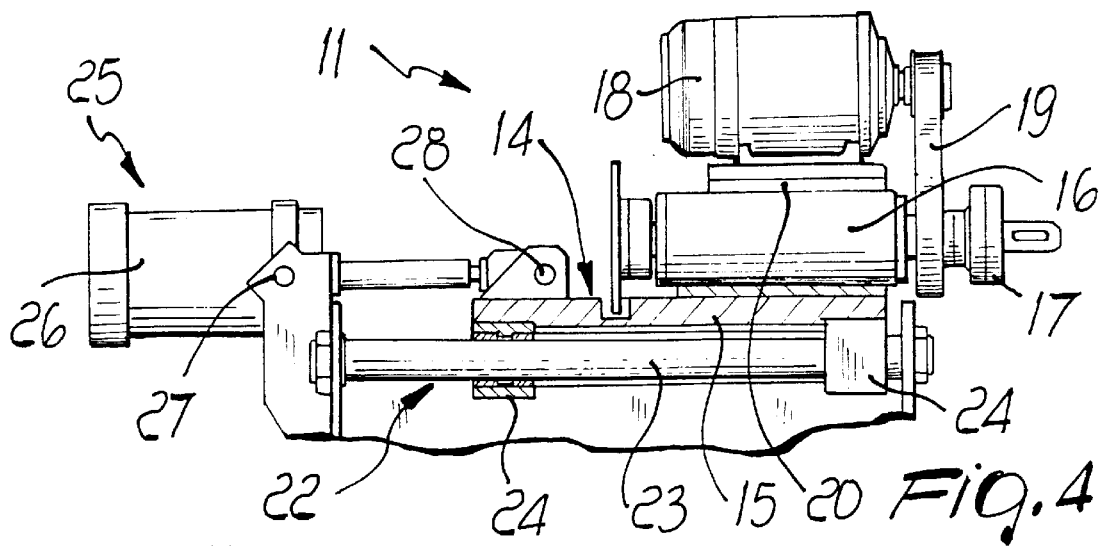
FIG. 4 is a partially sectional, elevational detail view illustrating the arrangement of a first slider on the first head section of the machine of FIGS. 1 and 2.
Figure 5:
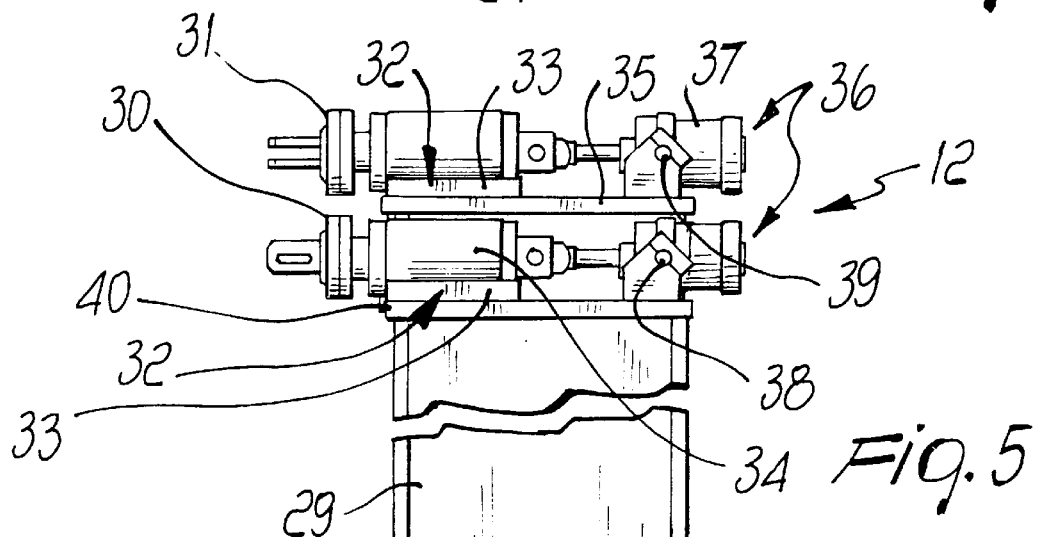
FIG. 5 is an elevational view of the second head section of the machine of FIGS. 1–4.
Figure 1:
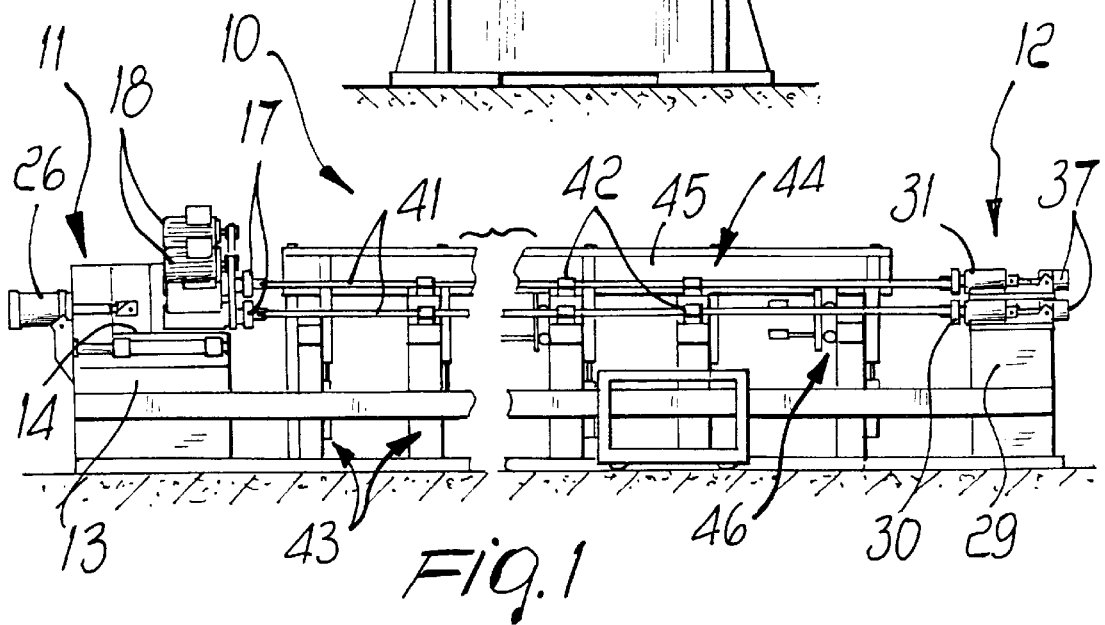
FIG. 1 is a front elevational view of the machine according to the invention.

With particular reference to FIGS. 1 to 5, a machine, particularly for producing vulcanized rubber tubes, according to the invention, is generally designated by the reference numeral 10.

The machine 10 comprises two mutually opposite head sections.

More specifically, it comprises a first head section 11 and a second head section 12.

The first head section 11 is constituted by a base 13 whereon two first sliders 14 are slideably coupled; each slider is constituted, in this case, by a first plate 15 whereon two frames 16 are directly fixed, each frame supporting a spindle 17.

Each one of the two spindles 17 of each slider 14 is motorized by means of an associated electric motor 18 that is linked to the corresponding spindle 17 by a belt 19.

The two electric motors 18 are both fixed to a second plate 20 which is in turn fixed above the frames 16.

As an alternative, a single electric motor may be provided which actuates both spindles 17 by means of kinematic transmissions such as belts.

Each first slider 14, in its operating configuration, is inclined with respect to the horizontal plane so that its upper part frontally faces the operator.

Furthermore, each first slider 14 slides on opposite longitudinal guides in the illustrated example constituted by a flat guide 21 and a guide 22 which is constituted, in the illustrated example, by a pivot 23 rigidly fixed to the base 13 and along which tubular bushes 24 slide; said bushes are welded below the corresponding edge of the first plate 15.

The guide 22 substantially constitutes not only a translatory motion retainer but also a hinge-like coupling that can be appropriately used, in maintenance and/or repair configuration, since the first slider 14 can be turned over about said pivot 23, thus offering better access to the operator.

The machine 10 furthermore comprises first actuator means, generally designated by the reference numeral 25, which are adapted to move each first slider 15 in a direction that is substantially parallel to the axis of the pivot 23.

The first actuator means 25 comprise, in this case, a hydraulic cylinder 26 that is supported and coupled, at one end, by means of a hinge-like coupling 27, to the base 13; the other end is in turn coupled, by means of a hinge-like coupling 28, to the upper part of the first plate 15.

The line of action of the hydraulic cylinder 26 lies substantially in a median region between the rotation axes of the spindles 17 and is parallel to said axes.

The second section 12 comprises a second base 29 that supports, as described hereinafter, two pairs of free spindles designated by the reference numerals 30 and 31, respectively, for each pair.

The free spindle 30 is supported by a second slider 32 that is slidingly coupled to the second base 29.

The second slider 32 is constituted by a third plate 33 lying on a substantially horizontal plane.

Furthermore, the free spindle 30 is contained in a frame 34 above which a fourth plate 35 is fixed; another second slider 32, related to the free spindle 31, slides on said fourth plate.

The machine 10 furthermore comprises second actuator means, generally designated by the reference numeral 36, which are constituted in this case by two hydraulic cylinders 37, each of which moves respectively the free spindle 30 and the free spindle 31.

The hydraulic cylinder 37 connected to the free spindle 30 is fixed by means of a hinge-like coupling 38 to the second base 29, whereas the hydraulic cylinder 37 connected to the free spindle 31 is fixed to the fourth plate 35 by means of a hinge-like coupling 39.

The other ends of the hydraulic cylinders 37 are pivoted respectively to the free spindle 30 and to the free spindle 31.

Furthermore, at the opposite lower edge, relative to the corresponding hydraulic cylinder 37, of the third plate 33 connected to the free spindle 30 there is provided a raised portion 40 adapted to act as a stroke limiter for the movement of the block constituted by both free spindles 30 and 31.

During operation, corresponding tubular cores 41 are subjected to constant rotation between opposite spindles 17 and 30 and 17 and 31; each core is supported, along its span, by supporting elements 42 that are fixed to a supporting frame 43 interposed between the first section 11 and the second section 12.

The machine 10 may also comprise a vulcanization oven 44 constituted by a container 45 adapted to contain the cores 41 wrapped by the tube to be vulcanized (not shown in the figures) and unloaded into the oven 44 by transfer means 46.

In practice it has been observed that the machine according to the invention has achieved the intended aim and objects.

In particular, it should be noted that although said machine maintains qualitative and quantitative levels in terms of production, speed of execution, limited space occupation, and costs that are competitive with, if not better than, those of known types, it has substantially solved the drawbacks related to accessibility during maintenance and/or repair.

The sliders that support the spindles, in addition to tension adjustment, which allows considerable production flexibility as regards the tube lengths to be produced, allow to turn over or shift the spindles, which are thus easily available to the operator.

The machine according to the invention furthermore solves the drawbacks without substantial increases in terms of constructive complexity, also maintaining optimum overall strength and reliability characteristics.

The present invention is susceptible to numerous modifications and variations, all of which are within the scope of the inventive concept.

All the details may furthermore be replaced with other technically equivalent elements.

The materials as well as the dimensions may be any according to the requirements.

What is claimed is:

1. Machine particularly for producing vulcanized rubber tubes, comprising two mutually opposite head sections, each having a base supporting at least one pair of spindles, at least a first one of said two head sections having motorized spindles, the mutually opposite spindles of said two head sections rotating, during operation, a corresponding tubular core supported, along its span, by supporting elements fixed to a supporting frame interposed between said two head sections, wherein each one of said pairs of motorized spindles is supported, together with its drive unit, on a corresponding first slider which is movably coupled to the corresponding base, said first slider being inclined with respect to a horizontal plane such that its upper part is exposed frontally to the operator.

2. Machine according to claim 1, further comprising first actuator means adapted to move said first slider in a direction that is parallel to the longitudinal extension of said core.

3. Machine according to claim 2, wherein said first actuator means comprise a hydraulic cylinder rigidly supported by the corresponding base.

4. Machine according to claim 1, wherein said first slider is constituted by a first plate whereon the frames related to said two motorized spindles are fixed directly, a second plate being fixed above said frames, the drive unit of said two motorized spindles being in turn fixed to said second plate.

5. Machine according to claim 1, wherein said first slider runs along guides, at least one of said guides being constituted by a pivot fixed to said base, tubular bushes being slideable along said pivot, said bushes being in turn fixed to said first slider, said first slider being rotatable about said pivot in a maintenance and/or repair configuration.

6. Machine according to claim 4, wherein said drive unit comprises two electric motors, each connected to one of said motorized spindles by means of a belt.

7. Machine according to claim 4, wherein said drive unit comprises a single electric motor connected to both of said spindles of said first head section by means of belts.

8. Machine according to claim 1, wherein the spindles of a second one of said two head sections are arranged in pairs and are free, each spindle being supported by a corresponding second slider slidingly coupled to the corresponding base.

9. Machine according to claim 6, wherein each one of said second sliders is constituted by a corresponding third plate arranged on a substantially horizontal plane.

10. Machine according to claim 8, wherein each one of said second sliders is moved by second actuator means.

11. Machine according to claim 10, wherein said second actuator means are constituted by hydraulic cylinders, each adapted to move a corresponding free spindle in a direction that is substantially parallel to the longitudinal extension of said core.

12. Machine according to claim 8, wherein each pair of said free spindles comprises one spindle having a frame fixed to a corresponding third plate that slides directly on the corresponding base, and another free spindle having a corresponding third plate slideable along a fourth plate fixed above the frame of said one free spindle.

13. Machine according to claim 12, wherein it comprises stroke limiter means for said free spindles.

14. Machine according to claim 13, wherein said stroke limiter means comprise a raised portion protruding below said third plate that slides directly on the base, said raised portion abutting directly against said base.

* * * * *